(12) United States Patent
Hocking et al.

(10) Patent No.: US 9,650,039 B2
(45) Date of Patent: May 16, 2017

(54) VEHICLE LOCATION ACCURACY (71) Applicant: Ford Global Technologies, LLC, Dearborn, MI (US)

(72) Inventors: Christopher James Hocking, Dearborn, MI (US); Kenneth James Miller, Canton, MI (US); Douglas Raymond Martin, Canton, MI (US); William Paul Perkins, Dearborn, MI (US); Thomas G. Leone, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 56 days.

(21) Appl. No.: 14/663,529

(22) Filed: Mar. 20, 2015

(65) Prior Publication Data

US 2016/0272196 A1 Sep. 22, 2016

(51) Int. Cl.
| | |
|---|---|
| *G05D 1/00* | (2006.01) |
| *G05D 3/00* | (2006.01) |
| *G06F 7/00* | (2006.01) |
| *G06F 17/00* | (2006.01) |
| *B60W 30/02* | (2012.01) |
| *G01S 19/24* | (2010.01) |
| *G01S 19/49* | (2010.01) |

(52) U.S. Cl.
CPC .......... *B60W 30/02* (2013.01); *G01S 19/24* (2013.01); *G01S 19/49* (2013.01)

(58) Field of Classification Search
CPC ....... B60W 30/02; B60W 30/00; G01S 19/24; G01S 19/246; G01S 19/25; G01S 19/26

USPC ... 701/1, 400, 412, 445, 449, 468, 469, 472, 701/494, 495, 498, 500, 501, 505
See application file for complete search history.

(56) References Cited

U.S. PATENT DOCUMENTS

| | | | |
|---|---|---|---|
| 6,351,698 B1 | 2/2002 | Kubota et al. | |
| 6,611,755 B1* | 8/2003 | Coffee | B28C 5/422 340/438 |
| 6,946,978 B2 | 9/2005 | Schofield | |
| 7,155,336 B2 | 12/2006 | Dorfman et al. | |
| 7,957,897 B2* | 6/2011 | Basnayake | G01C 25/00 701/501 |
| 8,165,806 B2* | 4/2012 | Yasan | G01C 21/28 701/469 |
| 8,301,374 B2 | 10/2012 | Surampudi et al. | |
| 8,666,589 B2* | 3/2014 | Munnix | B60W 40/10 701/30.2 |
| 2002/0158796 A1* | 10/2002 | Humphrey | G01C 21/165 342/357.31 |
| 2002/0198656 A1* | 12/2002 | Ford | G01C 21/165 701/472 |

(Continued)

FOREIGN PATENT DOCUMENTS

KR 20140078158 A 6/2014

*Primary Examiner* — Jaime Figueroa
(74) *Attorney, Agent, or Firm* — Franklin A. MacKenzie; Brooks Kushman P.C.

(57) ABSTRACT

A controller may maintain a last-known vehicle location, and, when satellite-positioning data is unavailable from a satellite-based positioning-system module, utilize compass data and stability control data to estimate a current vehicle location from the last-known vehicle location. The controller may avoid use of the compass data to estimate the current vehicle location when the vehicle is accelerating or decelerating in East or West headings.

16 Claims, 5 Drawing Sheets

(56) References Cited

U.S. PATENT DOCUMENTS

| | | | |
|---|---|---|---|
| 2003/0135327 A1* | 7/2003 | Levine | G01C 21/165 |
| | | | 701/500 |
| 2009/0005985 A1* | 1/2009 | Basnayake | G01C 25/00 |
| | | | 701/501 |
| 2009/0088974 A1* | 4/2009 | Yasan | G01S 19/48 |
| | | | 701/469 |
| 2011/0112739 A1* | 5/2011 | O'Dea | G01S 19/52 |
| | | | 701/70 |
| 2012/0022780 A1* | 1/2012 | Kulik | G01C 21/28 |
| | | | 701/498 |
| 2012/0110511 A1* | 5/2012 | Howard | G06F 3/0488 |
| | | | 715/835 |
| 2013/0141578 A1 | 6/2013 | Chundrlik, Jr. et al. | |
| 2014/0067154 A1* | 3/2014 | Yu | B60W 40/076 |
| | | | 701/1 |
| 2015/0274174 A1* | 10/2015 | Tao | B60W 40/076 |
| | | | 701/1 |

* cited by examiner

VEHICLE LOCATION ACCURACY

TECHNICAL FIELD

Aspects of the disclosure relate to improving vehicle location accuracy in poor signal conditions for satellite-based positioning systems (e.g., GPS)/assisted GPS (a GPS) reception.

BACKGROUND

Automotive vehicles are commonly equipped with multiple sensing devices for sensing dynamic movement of the vehicle and generating output signals indicative of the sensed movement. The sensed vehicle dynamics output signals are typically made available to various on-board vehicle control systems to further enhance the vehicle driving performance. Advanced vehicle dynamics control systems, including active suspension control, traction control, and brake control systems, often employ sensed vehicle dynamics information such as roll angle, pitch angle, yaw rate, roll rate, pitch rate, lateral and longitudinal velocity, lateral and longitudinal acceleration, tire slip, tire slip rate, and other sensed vehicle parameters. Given a variety of sensed vehicle dynamics measurements, the vehicle dynamic control systems are able to adaptively adjust the vehicle ride, such as providing enhanced vehicle tilt control.

In very high density urban areas or inside a building such as a parking garage, a vehicle equipped with GPS or assisted-GPS may not be able to determine its location accurately due to loss of GPS signal. For example, a driver may pull out of a parking space in a parking garage and be unable to identify whether to turn left or right. However when the driver looks to the vehicle navigation system for directions, the navigation system may receive insufficient GPS signal to locate the vehicle.

SUMMARY

In a first illustrative embodiment, a system includes a satellite-based positioning-system module configured to provide satellite-positioning data; a compass configured to provide compass data; a stability control system configured to provide stability control data; and a controller configured to maintain a last-known vehicle location, and, when the satellite-positioning data is unavailable from the satellite-based positioning-system module, utilize the compass data and the stability control data to estimate a current vehicle location from the last-known vehicle location.

In a second illustrative embodiment, a computer-implemented method includes, when satellite-based positioning-system data is available from a satellite-positioning module, identifying a current vehicle location via the satellite-positioning module; and otherwise, determining the current vehicle location based on a last-known vehicle location, compass heading from a compass, and stability control data from a stability control system, such that the compass heading is corrected according to forward acceleration and grade identified from the stability control data.

In a third illustrative embodiment, a vehicle includes a controller configured to compute a plurality of estimates of a current location of the vehicle, each estimate being performed using a different non-satellite-based-positioning-system approach; identify a subset of the plurality of estimates of the current locations based on consistency relative to one another; and average the subset of the plurality of estimates to compute an overall current location of the vehicle.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Vehicle navigation systems may be dependent on GPS or aGPS data to identify the current location of the vehicle. However, when GPS data is unavailable or too inaccurate, the vehicle may use various types of non-GPS sensor inputs to track the vehicle.

For instance, in-vehicle compass signals may be utilized for vehicle location and vehicle direction approximation. In such an approach, a current vehicle position may be estimated according to a last known position of the vehicle, vehicle speed, and vehicle direction. Such approaches may rely on compass heading, which can become less accurate during acceleration and deceleration when traveling East or West. As another possibility, single or multi-axis gyroscopes may be added to a vehicle to approximate vehicle location and direction in combination with vehicle speed. However, such approaches may be inaccurate, and may require inclusion of additional vehicle hardware.

In another example, the vehicle may be configured to use visual recognition techniques to track distance and direction changes from a last GPS fix. As a further example, the vehicle may utilize stability control system signals such as yaw, roll, and pitch to improve accuracy during grades, turns, or other movements, as well as to correct or omit the compass readings to compensate for false deflections when accelerating or decelerating in an East or West direction. In an even further example, the vehicle may use steering angle sensor and vehicle speed sensor to determine heading and location.

In some cases, the vehicle may be configured to determine the current location by combining multiple approaches to determining the vehicle location using non-GPS sensor inputs. For instance, the vehicle may be configured to compare location calculations using visual indications, compass data, and vehicle speed and steering angle data, determine the two methods that agree the most, and utilize an average of these two methods as the new current vehicle location. Thus, multiple of these approaches may be utilized when the primary GPS data is insufficient.

A vehicle may also maintain GPS availability state information when parked (e.g., that there is no GPS signal detected when parking in a parking garage), so when the vehicle is restarted it may be able to more quickly identify whether the alternate approaches to vehicle location detection are required. It should be noted that many examples herein refer to GPS systems, but it should be noted that the described techniques are applicable to other satellite-based position systems, such as the GLONASS Global Navigation Satellite System and the Galileo global navigation satellite system (GNSS), as some other possibilities. Further aspects of the disclosure are described in detail below.

Figure 1:
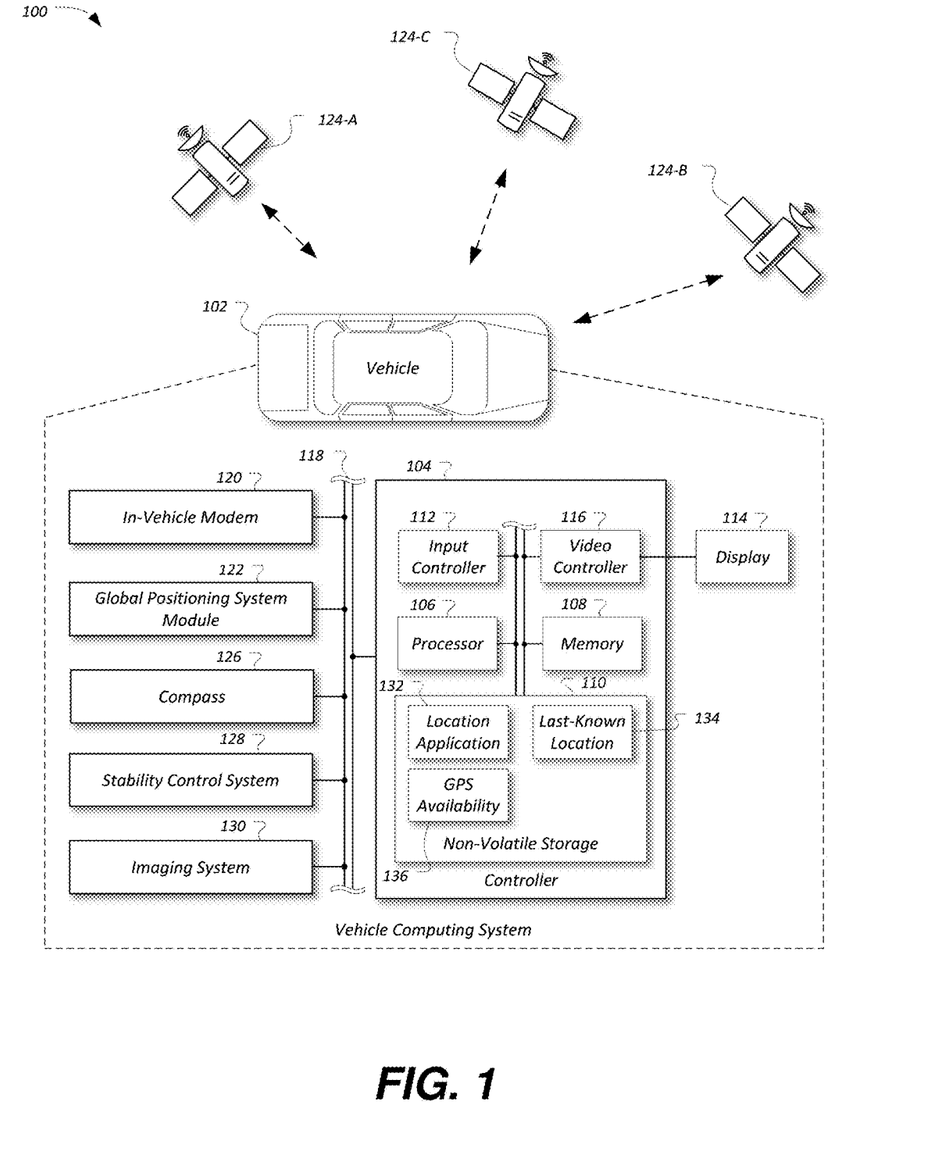
FIG. 1 illustrates an example diagram of a system configured to provide location-based services to a vehicle.

FIG. 1 illustrates an example diagram of a system 100 configured to provide location-based services to a vehicle 102. The vehicle 102 may include various types of passenger vehicle, such as crossover utility vehicle (CUV), sport utility vehicle (SUV), truck, recreational vehicle (RV), boat, plane or other mobile machine for transporting people or goods. Location-based services may include telematics services such as navigation, turn-by-turn directions, and weather reports, or non-telematics services such as park assist or collision detection. It should be noted that the illustrated system 100 is merely an example, and more, fewer, and/or differently located elements may be used.

The controller 104 may include one or more processors 106 configured to perform instructions, commands and other routines in support of the processes described herein. For instance, the controller 104 may be configured to execute instructions of vehicle applications loaded to a memory 108 to provide features such as navigation, turn-by-turn directions, and park assist. Such instructions and other data may be maintained in a non-volatile manner using a variety of types of computer-readable storage medium 110. The computer-readable medium 110 (also referred to as a processor-readable medium or storage) includes any non-transitory medium (e.g., a tangible medium) that participates in providing instructions or other data that may be read by the processor 106 of the controller 104. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

The controller 104 may be provided with various features allowing the vehicle occupants to interface with the controller 104. For example, the controller 104 may include an input controller 112 configured to receive user input from one or more human-machine interface (HMI) controls of the vehicle 102 providing for occupant interaction with the vehicle 102. These may include one or more buttons or other HMI controls configured to invoke functions on the controller 104 (e.g., steering wheel audio buttons, a push-to-talk button, instrument panel controls, etc.). The controller 104 may also drive or otherwise communicate with one or more displays 114 configured to provide visual output to vehicle occupants by way of a video controller 116. In some cases, the display 114 may be a touch screen further configured to receive user touch input via the video controller 116, while in other cases the display 114 may be a display only, without touch input capabilities.

The controller 104 may be further configured to communicate with other components of the vehicle 102 via one or more in-vehicle buses 118. The in-vehicle buses 118 may include one or more of a vehicle controller area network (CAN), an Ethernet network, and a media oriented system transfer (MOST), as some examples. The in-vehicle buses 118 may allow the controller 104 to communicate with other vehicle 102 systems. As shown, vehicle systems described in detail below may communicate with the controller 104 over an in-vehicle bus 118. In other examples, the controller 104 may be connected to more or fewer in-vehicle buses 118. For instance, the audio module and the HMI controls may communicate with the controller 104 over another in-vehicle bus separate from the illustrated vehicle bus 118. Additionally or alternately, one or more HMI controls or other components may be connected to the controller 104 via different in-vehicle buses 118 than shown, or directly without connection to an in-vehicle bus 118.

The vehicle 102 may include an in-vehicle modem 120 (which may not be present in some configurations). If so equipped, the controller 104 may use the in-vehicle modem 120 to access communications services of a communications network (not shown), such as packet-switched network services (e.g., Internet access, voice over Internet protocol (VoIP) communication services) available to devices connected to the communications network. To facilitate the communications over the communications network, the in-vehicle modem 120 may be associated with unique device identifiers (e.g., mobile device numbers (MDNs), Internet protocol (IP) addresses, etc.) to identify the communications of the in-vehicle modem 120 over the communications network.

The vehicle 102 may also include a global positioning system (GPS) module 122 configured to provide current vehicle 102 location and heading information. To do so, the GPS module 122 may receive satellite positioning data as well as data on clock timing transmitted from multiple GPS satellites 124 (only three GPS satellites 124-A, 124-B, and 124-C are shown for simplicity, but a GPS system would typically include many more). Using the satellite data, the GPS module 122 may precisely measure the distance from selected ones of the GPS satellites to the GPS module 122 antenna and therefore may compute the position GPS module 122 position, velocity, and time parameters to a high degree of accuracy using triangulation techniques.

The vehicle 102 may also include a compass 126. The compass 126 may include a magneto-resistive sensor circuit having a plurality of magnetic field sensors. In an example, each sensor may be aligned on an axis and configured to convert incident magnetic fields in the axis direction to differential voltage output. For instance, the magneto-resistive sensors may include nickel-iron a thin-film patterned as a resistive strip element, such that in the presence of a magnetic field, a change in the bridge resistive elements causes a corresponding change in voltage across the bridge outputs.

Figure 2:
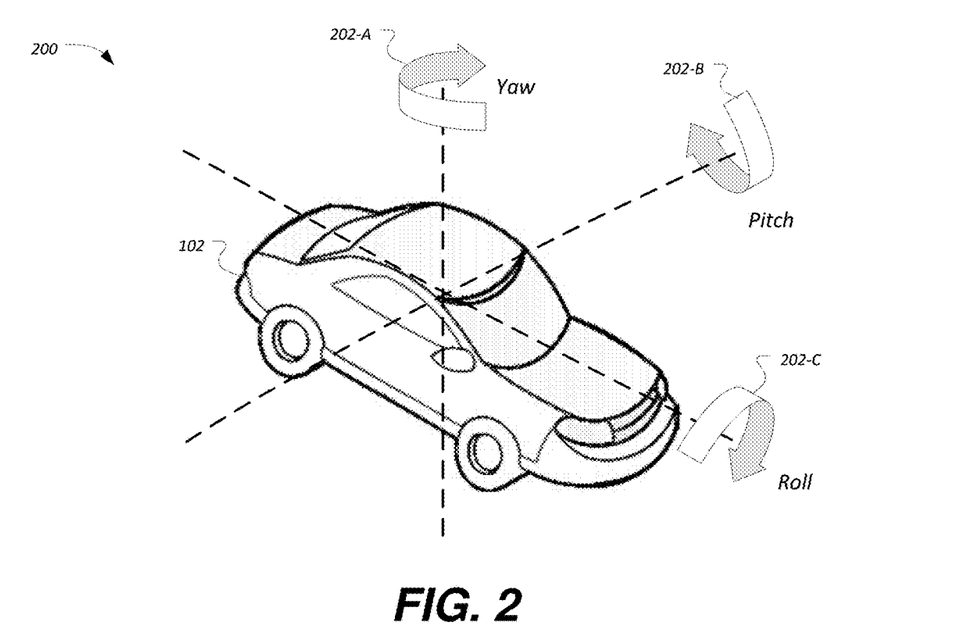
FIG. 2 illustrates an example of stability control vehicle sensor data for a vehicle.

The vehicle 102 may also include a stability control system 128. The stability control system 128 may include sensors configured to analyze forces interacting with the vehicle 102 to identify possible rollover or instability conditions of the vehicle 102. As some possible sensors, the stability control system 128 may include a yaw rate sensor, a speed sensor, a lateral acceleration sensor, a vertical acceleration sensor, a roll angular rate sensor, a hand wheel sensor (steering wheel within the vehicle 102), a longitudinal acceleration sensor, a pitch rate sensor, steering angle (of the wheels or actuator) position sensor (steered wheel angle), and a suspension position (height) sensor. FIG. 2 illustrates an example 200 of vehicle sensor data provided by the stability control system 128. As shown, the stability control system 128 may provide yaw data 202-A from the yaw rate sensor, pitch data 202-B from the pitch rate sensor, and roll data 202-C from the roll angular rate sensor. It should be noted that these are merely examples, and various combinations and sub-combinations of the sensors may be used.

Returning to FIG. 1, the vehicle 102 may also include various imaging systems 130. The imaging systems 130 may be configured to allow the vehicle 102 to gain information regarding obstructions, moving objects, or other aspects of the environment surrounding the vehicle 102. As an example, the imaging systems 130 may include a front-mounted camera (e.g., behind a front grill of the vehicle 102, inside the vehicle 102 at the top of the front windshield facing forwards, on a roof rack facing forwards, etc.) configured to capture image or video in front of the vehicle 102, and a rear-mounted camera (e.g., above a license plate, on a rear trunk lid, incorporated into a rear bumper, inside the vehicle facing out a rear windshield, etc.) configured to capture image or video behind the vehicle 102. As another example, the imaging systems 130 may include radar or lidar sensors incorporated into the exterior of the vehicle 102 and configured to detect incoming objects or proximity of objects as the vehicle 102 travels. It should be noted that these imaging systems 130 are merely exemplary, and more, fewer, and/or differently-located imaging systems 130 may be utilized in other examples.

The accuracy of information received from the GPS module 122 may depend on the quality of the available GPS satellite signals. Thus, in some cases, such as in a parking garage or where buildings or the landscape obstructs the GPS module's 122 view of the sky, GPS satellite signals may be insufficient to locate the vehicle 102 with accuracy.

A location determination application 132 may be installed to the controller 104 and utilized to allow the vehicle 102 to maintain a last-known location 134 of the vehicle 102. When GPS is available, the location determination application 132 may be configured to utilize the GPS module 122 to determine the current vehicle location. The location determination application 132 may use the determined location as a last-known location 134, and may store the last-known location 134 to a non-volatile storage area of the controller 104, such as the storage 110. The last-known location 134 may further be maintained in the storage 110 after vehicle 102 key-off, to be available to the vehicle 102 upon vehicle 102 key-on, without having to be recalculated. This may be advantageous in determining a vehicle 102 location when a vehicle 102 is first entered, as acquiring GPS signals may require on the order of thirty seconds, and during that time without the last-known location 134 the controller 104 may be unable to provide location information or location-based services.

The location determination application 132 may also be configured to set a GPS availability flag 136 (e.g., stored to the storage 110) indicative of whether GPS is available. By maintaining the GPS availability flag 136 between vehicle key-on cycles, the vehicle 102 may be able to readily determine whether information other than GPS should be used to determine the current location, without having to attempt to connect to the GPS satellites 124.

Figure 3:
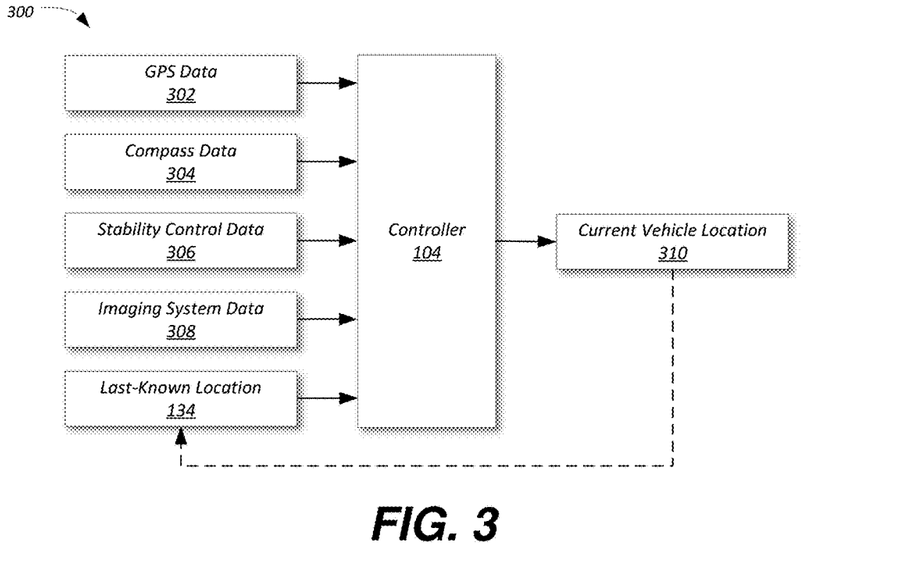
FIG. 3 illustrates an example data flow diagram for determining a current vehicle location using vehicle sensor data.

FIG. 3 illustrates an example data flow diagram 300 for determining a current vehicle location 310 using vehicle sensor data. As shown, the controller 104 may receive GPS data 302 from the GPS module 122, compass data 304 from the compass 126, stability control data 306 from the stability control system 128, imaging system data 308 from the imaging systems 130, and the last-known location 134 from the storage 110. Using the received information, the controller 104 may compute the current vehicle location 310. The controller 104 may then update the last-known location 134 using the determined current vehicle location 310.

The GPS data 302 may include information indicative of one or more of: whether data from the GPS satellites 124 has been established, strength of the GPS signal, current vehicle latitude and longitude, a current time, and a margin of error for the GPS location fix. The compass data 304 may include information indicative of magnetic vehicle 102 heading. The stability control data 306 may include information indicative of one or more of: yaw rate, vehicle 102 speed, vehicle 102 lateral acceleration, vehicle 102 vertical acceleration, vehicle 102 roll angular rate, vehicle 102 hand wheel position, vehicle 102 longitudinal acceleration, vehicle 102 pitch rate, actual vehicle 102 steering angle, and vehicle 102 suspension position. The imaging system data 308 may include raw and/or processed image data indicative of vehicle 102 proximity to objects.

When GPS is available, the location determination application 132 may be configured to rely on the GPS data 302. When GPS is unavailable, the location determination application 132 may be configured to utilize the information other than the GPS data 302 to determine the current vehicle location 310. Generally, the location determination application 132 may be configured to utilize one or more of the compass data 304, the stability control data 306, the imaging system data 308, and the last-known location 134 to determine the current vehicle location 310.

In a first example, when the location determination application 132 identifies from the GPS data 302 that GPS signal is unavailable, the location determination application 132 may be configured to utilize images from the imaging system data 308 to visually track distance and direction changes from the last-known location 134.

In a second example, when the location determination application 132 identifies that GPS signal is unavailable when the vehicle 102 is keyed on (e.g., using the GPS availability flag 136), such as when the vehicle 102 is parked in a parking garage, the location determination application 132 may use the imaging system data 308 to visually track distance and direction changes, but may further compare camera images of landmarks or structures, such as a garage pillars, from the end of the last trip to determine if the vehicle 102 has changed location (i.e. if the vehicle 102 was moved when the imaging systems 130 camera was off or otherwise inoperable).

In a third example, when the location determination application 132 identifies that GPS signal is unavailable, the location determination application 132 may use an image of the imaging system data 308 to read and identify highway signs or other identifiable objects that define an approximate location to re-establish as the current vehicle location 310. As some non-limiting examples, these signs or other objects may include: urban/suburban street names; business names (e.g. restaurants, hotels, stores); points of interest (e.g. parks, churches, hospitals); mile markers on highways; and exit signs (e.g. exit 58 to Michigan Ave.).

In a fourth example, when the location determination application 132 identifies that GPS signal is unavailable, the location determination application 132 may utilize the compass data 304 to confirm and correct the vehicle 102 direction, but also determine the quantity of vehicle 102 acceleration or deceleration in the East or West direction using the stability control data 306. Using the stability control data 306, the location determination application 132 may accordingly correct errors in readings of the compass 126 during East or West accelerations (i.e., the "ANDS phenomenon" in dead-reckoning pilotage, where the compass will show false deflections of "accelerate north, decelerate south").

Figure 4A:
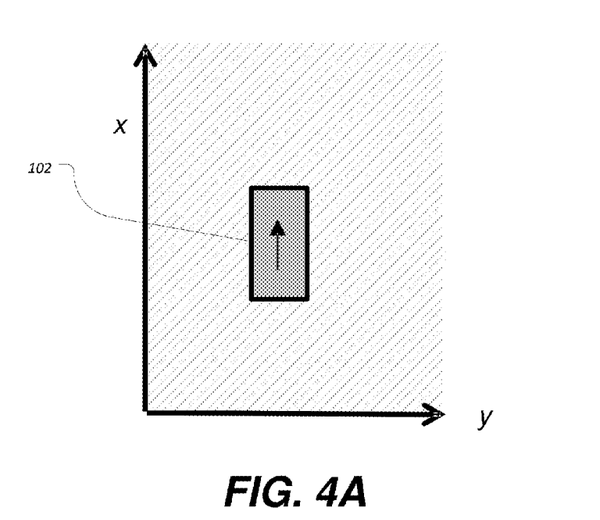
FIG. 4A illustrates an example top view of the vehicle traveling along an incline.
Figure 4B:
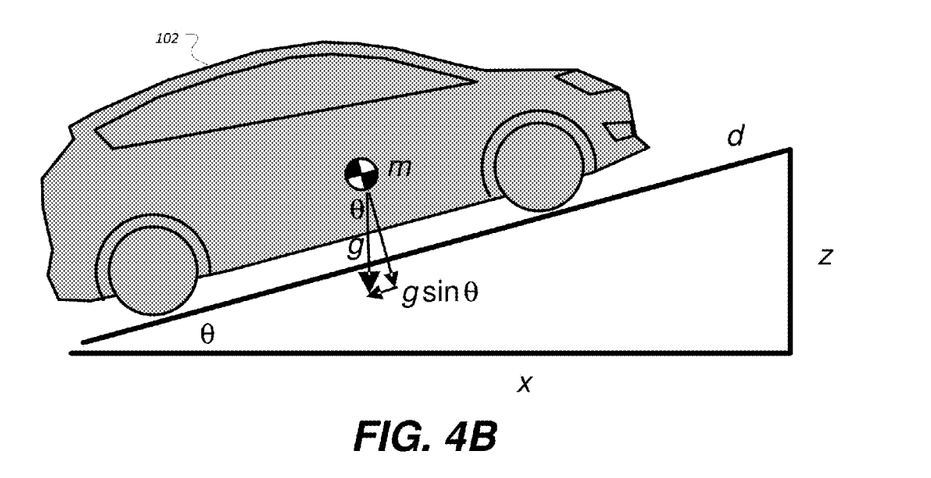
FIG. 4B illustrates an example side view of the vehicle traveling along an incline.

In a fifth example, the location determination application 132 may further correct the acceleration/decelerations using the stability control data 306 for yaw, roll, and pitch to improve accuracy during grades and turns, as some possibilities. As shown in FIGS. 4A and 4B, estimating a true x- and y-position of the vehicle 102 on a surface may be obfuscated when travelling uphill or downhill. As illustrated in the FIG. 4A, the vehicle 102 appears from a top view to be travelling in an x-direction. However, the vehicle 102 may estimate the x-distance travelled by the vehicle 102 according to an integral of wheel-speed with respect to time. As illustrated in FIG. 4B in a side view of the vehicle 102, the wheel-speed-derived distance is actually a hypotenuse of the distance traveled and height change, not a true x-distance. To determine the true x-distance, the vehicle 102 may compare longitudinal accelerometer $(a_{x1})$ to differential wheel-speed $(a_{x2})$. The difference informs the vehicle what the road grade is (aka uphill/downhill angle θ), and from this it can calculate true x-distance=d*cos(θ). Consequently, when GPS data 302 is not available, the vehicle 102 may be able to accurately determine position on x-y plane.

In many cases, the vehicle is not travelling only in x-direction, but in combined x- and y-directions. Nevertheless, the aforementioned correction for height may be generally performed such that the output of the wheel-speed sensor data and the accelerometer data is resolved into x- and y-components using bearing (directional) data, e.g., obtained using compass data 304 from the compass 126 or other methods described herein. In some cases, the stability control system 128 or other vehicle 102 system may include a roll sensor. Output from the roll sensor may further be used by the vehicle 102 to similarly to correct data when vehicle 102 is proceeding around surfaces such as a dome-shaped surface. In such a case, the wheel-speed sensors may indicate that yaw=Y1, but in reality yaw=Y2, as corrected by the roll sensor.

In a sixth example, the location determination application 132 may use the steering angle and vehicle speed data of the stability control data 306 to determine heading and location.

In a seventh example, the location determination application 132 may combine the above example solutions to achieve improved redundancy and accuracy of non-GPS-determined current vehicle locations 310. For instance, the location determination application 132 may compare the location calculations from multiple of the aforementioned example solutions, determine two methods that agree the most, and update the last-known location 134 as an average of the two most-agreeing example solutions. Further aspects of the operation of the location determination application 132 are discussed in detail with respect to FIGS. 4-7 below.

Figure 5:
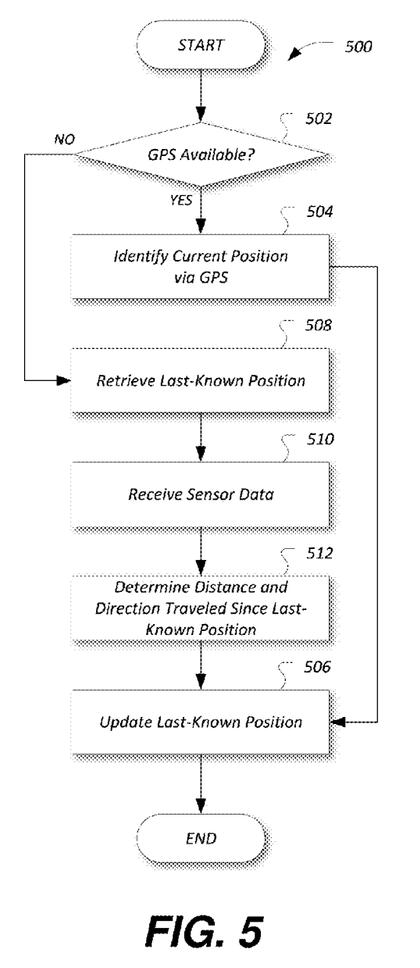
FIG. 5 illustrates an example process for utilizing GPS or other sensor data to update the last-known location.

FIG. 5 illustrates an example process 500 for utilizing GPS or other sensor data to update the last-known location 134. The process 500 may be performed, in an example, by the controller 104 executing the location determination application 132.

At operation 502, the controller 104 determines whether GPS is available. In an example, the location determination application 132 may check the GPS availability flag 136 to determine whether GPS is currently available. In another example, the location determination application 132 may query the GPS module 122 to determine a current GPS connection status. Responsive to the query, the controller 104 may receive status information indicating whether or not the vehicle 102 is currently receiving GPS information, and may update the GPS availability flag 136. If GPS is available, control passes to operation 504. Otherwise, control passes to operation 508.

At operation 504, the controller 104 determines the current vehicle location 310 using GPS. In an example, the location determination application 132 may cause the controller 104 to receive the current vehicle location 310 over the vehicle bus 118 from the GPS module 122.

At operation 506, the controller 104 updates the last-known location 134 with the current vehicle location 310. In an example, the location determination application 132 may validate that the current vehicle location 310 is plausible (e.g., within a predetermined distance from a previous location, etc.). If the current vehicle location 310 is validated, the location determination application 132 may save the current vehicle location 310 as the new last-known location 134. After operation 506, the process 500 ends.

At operation 508, the controller 104 retrieves the last-known location 134. In an example, the location determination application 132 may retrieve the last-known location 134 from non-volatile storage of the controller 104, such as from the storage 110. The last-known location 134 may be used by the location determination application 132 as a basis for estimating a new current vehicle location 310.

At operation 510, the controller 104 receives sensor data from sources of location information other than GPS. As some examples, the location determination application 132 may receive imaging system data 308 from the imaging systems 130, compass data 304 from the compass 126, and stability control data 306 from the stability control system 128. After operation 510, control passes to operation 512.

At operation 512, the controller 104 determines distance and direction traveled since the last-known location 134. Example details of the determination of change in position since the last-known location 134 are discussed in detail below with respect to the processes 500, 500 and 600. After operation 512, control passes to operation 506.

Figure 6:
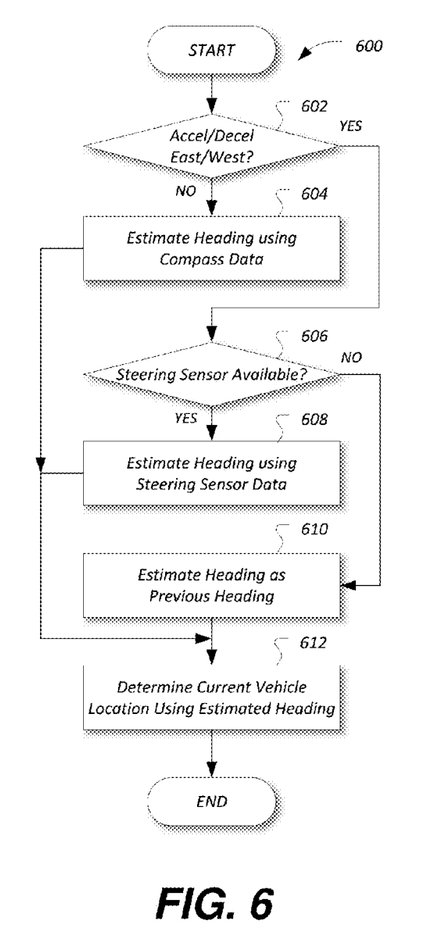
FIG. 6 illustrates an example process for determining the current vehicle location using compass data and stability control data.

FIG. 6 illustrates an example process 600 for determining the current vehicle location 310 using compass data 304 and stability control data 306. As with the process 500, the process 600 may be performed, in an example, by the controller 104 executing the location determination application 132.

At operation 602, the controller 104 determines whether the vehicle 102 is accelerating or decelerating in an East or West direction. In an example, the location determination application 132 may use the compass data 304 to determine the vehicle 102 heading, and the stability control data 306 to determine whether the vehicle 102 is accelerating in the East or West direction. As one possibility, the vehicle 102 may identify headings that are within +/−45 degrees from due East or West as being East or West headings. If the controller 104 determines the vehicle 102 is not accelerating or decelerating in an East or West direction, control passes to operation 604. Otherwise, control passes to operation 606.

At operation 604, the controller 104 estimates the vehicle 102 heading according to the compass data 304. In an example, the location determination application 132 may identify the magnetic heading angle from the compass data 304 as being the current heading. After operation 604, control passes to operation 612.

At operation 606, the controller 104 determines whether the steering sensor data is available. In an example, the location determination application 132 may use the stability control data 306 to determine whether steering sensor data is available for user in heading estimation. If so, control passes to operation 608. Otherwise, control passes to operation 610.

At operation 608, the controller 104 estimates the vehicle 102 heading according to the steering sensor data. In an example, the location determination application 132 may identify a steering angle offset from the heading indicated by the last-known location 134 using the steering sensor data, and may use that information to estimate the new heading. After operation 608, control passes to operation 612.

At operation 610, the controller 104 estimates the vehicle 102 heading as the same heading indicated by the last-known location 134. In an example, the location determination application 132 may utilize the existing heading information, lacking a source of heading information deemed by the location determination application 132 to be more reliable than the previously-identified heading. After operation 610, control passes to operation 612.

At operation 612, the controller 104 determines the current vehicle location 310 using the estimated heading. In an example, the location determination application 132 may determine the distance traveled according to wheel sensor data in the stability control data 306, and may determine the current vehicle location 310 as being the last-known location 134, as modified by the identified distance traveled and estimated heading. After operation 612, the process 600 ends.

Figure 7:
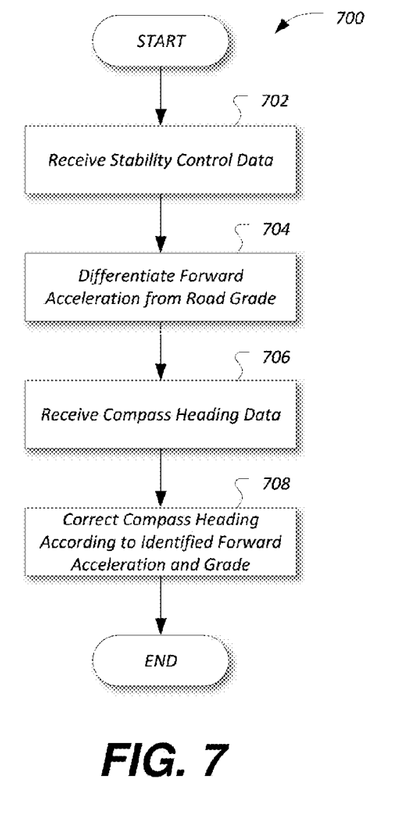
FIG. 7 illustrates an example process for using stability control system data to correcting compass data when updating the last-known location.

FIG. 7 illustrates an example process 700 for using stability control system 128 data to correct compass 126 data when updating the last-known location 134. As with the processes 500 and 600, the process 700 may be performed, in an example, by the controller 104 executing the location determination application 132.

At operation 702, the controller 104 receives stability control data 306. In an example, the location determination application 132 may receive the stability control data 306 from the stability control system 128 via the vehicle bus 118.

At operation 704, the controller 104 differentiates forward acceleration of the vehicle 102 from road grade. In an example, the location determination application 132 may utilize the longitudinal acceleration information (e.g., as illustrated in FIG. 2 as roll data 202-C) and pitch information (e.g., as illustrated in FIG. 2 as pitch data 202-B) to determine an amount of forward acceleration or deceleration of the vehicle 102, while also being differentiated from longitudinal road grade, which occurs having a different combination of longitudinal acceleration and pitch. Further examples are discussed above with respect to FIGS. 4A and 4B.

At operation 706, the controller 104 receives compass data 304. In an example, the location determination application 132 may receive the compass data 304 from the compass 126 via the vehicle bus 118.

At operation 708, the controller 104 corrects the compass data 304 according to the identified forward acceleration and grade. In an example, if the location determination application 132 determines that the acceleration data is due to road grade and not acceleration of the vehicle 102, the location determination application 132 may not perform adjustment to the compass data 304. In another example, if the location determination application 132 determines that some or all of the determined acceleration is forward acceleration, the location determination application 132 may perform a deflection on the compass data 304 to counteract the accelerate North, decelerate South effects that compass acceleration have on compass data 304. In yet a further example, if the location determination application 132 determines that some or all of the determined acceleration is forward acceleration, the location determination application 132 may indicate that the compass data 304 should not be used for heading determination (e.g., instead the location determination application 132 may rely on steering sensor input, imaging system data 308, etc.). After operation 708, the process 700 ends.

Figure 8:
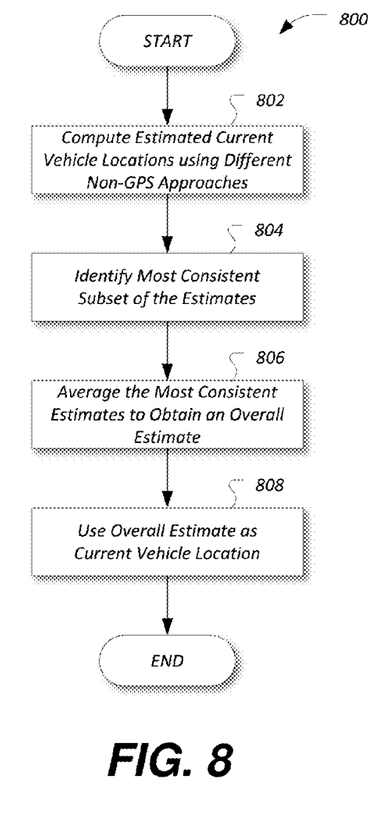
FIG. 8 illustrates an example process for using multiple non-GPS estimates of current vehicle location to determine an overall non-GPS current vehicle location.

FIG. 8 illustrates an example process 800 for using multiple non-GPS estimates of current vehicle location 310 to determine an overall non-GPS current vehicle location 310. As with the processes 500, 600, and 700, the process 800 may be performed, in an example, by the controller 104 executing the location determination application 132.

At operation 802, the controller 104 computes estimated current vehicle locations 310 using more than one different non-GPS approach. In an example, the location determination application 132 may utilize the imaging system data 308 to visually track distance and direction changes from the last-known location 134 to compute a current vehicle location 310. In another example, the location determination application 132 may utilize an image from the imaging system data 308 to read and identify highway signs or other identifiable objects that define a location to use as the current vehicle location 310. In yet another example, the location determination application 132 may utilize the compass data 304 and the stability control data 306 to compute the current vehicle location 310. It should be noted that these are merely examples, and various combinations and sub-combinations of approaches to determining the current vehicle location 310 may be used.

At operation 804, the controller 104 identifies the most consistent subset of the estimated current vehicle locations 310. In an example, the location determination application 132 may determine how close a given estimated current vehicle location 310 is to the overall average of the estimated current vehicle location 310. The location determination application 132 may further select the estimated current vehicle locations 310 that have the least difference from the overall average. In an example, the location determination application 132 may select the two estimated current vehicle location 310 closest to the average (or another number predetermined of the estimates). In another example, the location determination application 132 may select the closest 50% (or 25% or another predefined subset of the total number of the estimated current vehicle locations 310). In yet another example, the operation 804 may be omitted and the location determination application 132 may utilize all of the estimated current vehicle locations 310.

At operation 806, the controller 104 averages the most consistent estimated current vehicle locations 310 to obtain an overall estimated current vehicle location 310. In an example, the location determination application 132 may average the current vehicle locations 310 identified at operation 804.

At operation 808, the controller 104 uses the overall estimated current vehicle location 310 as the current vehicle locations 310. In an example, the location determination application 132 may proceed with using the overall estimated current vehicle location 310. After operation 808, the process 800 ends.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
a satellite-based positioning-system module configured to provide satellite-positioning data;
a compass configured to provide compass data;
a stability control system configured to provide stability control data; and
a controller configured to
maintain a last-known vehicle location,
maintain, between vehicle key-on cycles, a satellite-positioning availability flag indicative of whether the satellite-positioning data is unavailable, and,
when the satellite-positioning data is unavailable from the satellite-based positioning-system module, utilize the compass data and the stability control data to estimate a current vehicle location from the last-known vehicle location.

2. The system of claim 1, wherein the controller is further configured to avoid use of the compass data to estimate the current vehicle location when the vehicle is accelerating or decelerating in East or West headings.

3. A system comprising:
a satellite-based positioning-system module configured to provide satellite-positioning data;
a compass configured to provide compass data;
a stability control system configured to provide stability control data; and
a controller configured to
maintain a last-known vehicle location, and, when the satellite-positioning data is unavailable from the satellite-based positioning-system module, utilize the compass data and the stability control data to estimate a current vehicle location from the last-known vehicle location;
wherein the controller is further configured to identify headings that are within a predetermined number of degrees from due East or West as being East or West headings.

4. The vehicle of claim 3, wherein the predetermined number of degrees is +/−45 degrees.

5. The system of claim 1, wherein the controller is further configured to:
estimate the current vehicle location using a heading determined according to steering sensor data when the steering sensor data is available; and
estimate the current vehicle location using a heading determined according to a previous heading when the steering sensor data is unavailable.

6. A computer-implemented method comprising:
when satellite-based positioning-system data is available from a satellite-positioning module, identifying a current vehicle location via the satellite-positioning module;
when satellite-based positioning-system data is unavailable, determining the current vehicle location based on a last-known vehicle location, compass heading from a compass, and stability control data from a stability control system, such that the compass heading is corrected according to forward acceleration and grade identified from the stability control data; and
updating the last-known vehicle location according to the current vehicle location.

7. The method of claim 6, further comprising:
utilizing longitudinal accelerometer data and differential wheel speed to determine the grade;
calculating forward distance traveled according to the grade; and
outputting an indication of current vehicle location according to the forward distance traveled.

8. The method of claim 6, further comprising estimating the current vehicle location in part according to a heading determined using steering sensor data.

9. The method of claim 6, further comprising maintaining, between vehicle key-on cycles, a satellite-positioning availability flag indicative of whether the satellite-based positioning system data from the satellite-positioning module is unavailable.

10. A vehicle comprising:
a controller configured to
compute a plurality of estimates of a current location of the vehicle, each estimate being performed using a different non-satellite-based-positioning-system approach, one estimate based on vehicle-captured image data;
identify a subset of the plurality of estimates of the current locations based on consistency relative to one another; and
average the subset of the plurality of estimates to compute an overall current location of the vehicle.

11. The vehicle of claim 10, wherein the controller is further configured to determine one of the plurality of estimates of the current location based on a last-known vehicle location, compass heading from a compass, and stability control data from a stability control system, such that the compass heading is corrected according to forward acceleration and grade identified from the stability control data.

12. The vehicle of claim 10, wherein the controller is further configured to determine one of the plurality of estimates of the current location based on a previous vehicle heading and distance measure determined from wheel sensor data.

13. The vehicle of claim 10, wherein the controller is further configured to avoid use of compass data to estimate the current location when the vehicle is accelerating or decelerating in East or West headings.

14. The vehicle of claim 13, wherein the controller is further configured to identify headings that are within a predetermined number of degrees from due East or West as being East or West headings.

15. The vehicle of claim 14, wherein the predetermined number of degrees is +/−45 degrees.

16. The vehicle of claim 10, wherein the controller is further configured to determine one of the plurality of estimates of the current location by estimating the current location using a heading determined according to steering sensor data when the steering sensor data is available; and estimating the current location using a heading determined according to a previous heading when the steering sensor data is unavailable.

* * * * *